UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

SHOE-BOTTOM FILLER.

1,138,910.          Specification of Letters Patent.          Patented May 11, 1915.

No Drawing.          Application filed July 8, 1912. Serial No. 708,266.

*To all whom it may concern:*

Be it known that I, ANDREW THOMA, a citizen of the United States, and resident of Cambridge, in the county of Middlesex and State of Massachusetts, have invented an Improvement in Shoe-Bottom Fillers, of which the following is a description.

My present invention is a shoe-bottom filler for filling the bottom cavities of welt shoes, and this application is in part carved or derived from, and in part a continuation of, my previous application Serial No. 432,083, filed May 11, 1908, now Patent No. 1,032,312, dated July 9, 1912, and which was copending with the application of my Patent No. 945,294 of January 4, 1910, and both of which patents are subordinate to my foundation or pioneer filler Patent No. 832,002, of Sep. 25, 1906. I also refer hereinto my various other patents and copending and divisional applications for patents mentioned and referred to in my said application for patents mentioned and referred to in my said application 432,083. I have heretofore set forth various substances which act as restrainers of the low-melting wax tailings used as a binder for granulated filler-body material, and I have previously explained the advantage of admixing soft sticky wax tailings to jellified solutions of starch and other jelly-making materials, in which this sticky waxy residuum of petroleum is separated into minute parts and held in suspension by the fluffy jellified mass in a separated condition spread lightly throughout the body or mass of comminuted filler-body material. The jellified fluffy paste acts not only as a means for practically carrying these minute particles of the sticky wax tailings throughout the bulky filler mass, but also acts as a separator for said minute particles, and finally as a restrainer with reference to the setting quality of the filler. On account of the sticky adhesive nature of the wax tailings, I have also explained the great advantage gained by separating this substance into minute parts (preferably almost into molecules) in a thick sleeking fluid. Especially is this most useful whenever the mixing and the spreading of the shoe filler is carried on under ordinary conditions of temperature; my present invention relates to this feature more particularly, containing further improvements toward that end, in the art of making shoe-bottom fillers. The distinguishing characteristic of my filler as now presented is that a slippery, sleeking feature is predominant. That is, the components of the filler are so proportioned or modified, or added to, that instead of having the sticky element predominant so as to cling to and drag on the knife or laying tool, this sticky element is subordinate and the slippery and non-clinging component or feature is predominant when the filler is being laid in the shoe. For instance the same paste-making component as before may provide this feature if introduced as a liquid (instead of dry) in sufficiently controlling quantity and fluidity to predominate the mass, or the filler may be given the desired characteristic by being impregnated with steam or other volatile means of producing a sleeking-surface to control and dominate the mass during laying. In my previous applications, wherein I control the heat-sensitive component by a stiffening, firm-setting substance, or wherein the firm-setting, brittle, stiff component is rendered less fragile and more yielding by its close union with the more tenacious greater-sticking wax tailings, I have found that the resulting bottom-filling material, when made with only a very light coating of the cementing paste within the mass, does not possess enough of the slippery principle to allow the spreading tool quick and free play or movement without disturbing the granules of the body-material, because the wax tailings are persistently assertive within the filler-mass, so that, especially when so lightly spread throughout the filler-mass, they will follow the spreading tool unless the latter is heated. But when the pasty component is more predominant and especially when introduced into the filler as a liquid, or when the filler is charged with steam and rendered moist or wet, the said pasty component then becomes a sleeking or slippery component, and accordingly I have herein claimed this specific form of the invention which is generically covered in my Patent No. 1,032,312 already mentioned. This is one of the species, or specific embodiments, of my generic invention which is referred to on page 5, lines 118-121 of said patent as divided out from that case,—and the reason that the present case is not strictly a divisional application is due to the fact that I have herein greatly amplified the invention and have introduced a wider range of means for rendering the filler slippery or slimy in order to give it greater slipping or sleeking condition and capacity. For example, in said patent the principal objects of the invention were, on the one hand, to render a previously normally low-heat-responsive filler not liable to soften under mild heat when in use in the shoe, and, on the other hand, to render permanently pliable and non-brittle in use a filler which would otherwise tend to get brittle or set hard, many species for carrying out these objects being mentioned and generically claimed, but the preferred species of filler being, as to composition, the one containing water-repellent wax-tailings and material for making starch paste, and, as to mechanical form, the one with the ingredients put together in a relatively dry state and without cohesion for maintaining the binding qualities latent but to be developed when ready for use, and these species are therein duly claimed (along with the other generic claims).

The present application, therefore, aims to cover broadly the addition to said previous pasty and waxy or pitchy filler, of an additional slippery slimy component capable of giving an extreme or predominant slimy slipping characteristic to the filler. It aims to cover also a filler made so as to have such characteristics even though the filler proper should not be the particular kind of filler contemplated in said patent. Also this application contains that species of the generic invention of said patent which combines with the filler having a pasty component and a softening and binding component, additional and preferably volatile means for rendering the filler slimy and slippery as stated. And finally, this application contains that species which is disclosed, but not claimed, in said patent which combines with the low-melting filler material a relatively thick sleeking fluid sufficient in amount to give the filler mass said desired slimy slippery surface.

Also my present invention aims expressly to overcome and improve the above mentioned clinging or tool-following feature of my pastes and compositions for shoe-filler by rendering them especially slippery or slimy to facilitate their being conveniently and expeditiously spread into the shoe-bottom cavity.

My object is accomplished by various specific means. For example, by adding a certain proportion of a soapy solution to my previously explained pastes or compounds made from starch, flour, casein, dextrin, glue or gelatin, silicates, in conjunction with their softening or otherwise binding assistant, the resulting filler is made to possess all the advantages previously explained, besides this new advantage, i. e. a greater slipping or sleeking condition and capacity. The slippery slimy component, when dried by the evaporation of its volatile solvent and set within the mass, also acts like some of my other mucilaginous substances as a retarder or restrainer with relation to the sticky, heat-responsive element, and thereby fulfills the double purpose of acting as a slippery conveyer and also as a restrainer and in turn being acted upon by the sticky waxy component and made to conform to the desired use of acting as a permanently pliable, water-repellent binder for shoe-filler body material.

My present invention has a still larger scope of application in the use of substances which are in themselves mucilaginous and slimy or slippery,—as for instance the jellified mucilage extracted by means of boiling and pressure from seeds, such as flax, willow-weed or flea-wort, or quince stones, or various kinds of moss, such as Iceland moss, Irish moss (fucus), agar-agar, carageen, and others, or from roots, stalks, leaves, etc., or from seaweeds, some of which are known to contain considerable mucilaginous slippery matter which I have found capable of being used, either alone or in conjunction with other ingredients in acting as a separator for the wax tailings, or both as a separator and restrainer when the mass has become dry and set,—as for instance kelp. Some of these substances are very cheap, and for economical reasons alone are valuable for my purpose, especially when their jellifying properties are considered, which make them especially valuable as separators for the sticky component and as holders of moisture in a most desirable way, i. e. without being simply wet,—thereby providing the slippery slimy feature sought for the comminuted filler mass. As before stated, these slimy, slippery mucilaginous matters are extracted from plants in various states and portions, viz. roots, seeds, barks, leaves, stalks, in fact the entire plant, and the character of the extracted substances varies greatly. I find in some of the varieties a great slipperiness without any marked jellification of the liquor, while in others the fluffy nature of the extract is most pronounced. I do not enter into the subject at great length herein, because these properties are well known to those skilled in the art, my invention residing, not in the discovery of these properties, but in their application to my purpose in connection with shoe-bottom filler. It is my intention to use these peculiar qualities to the fullest extent, and accordingly I wish to include within the scope of my present invention all such substances and combinations for giving an extra or additional and predominant slimy slippery smoothing nature to the previous filler mass. Also all such substances for securing the desired distribution and separation of the sticky component in its finely disseminated or cut up and distributed condition throughout the filler mass. And finally all such substances which will also provide a retarding influence to control the low-melting tendency of the heat responsive sticky component. For example, powdered slippery elm, when soaked in water, produces a thick jelly-like slippery and slimy paste which, while predominant as a paste in the filler serves the first two objects of effecting the slippery characteristic and also the distribution or separation of the sticky component, and when it has evaporated or parted with its volatile portion, so as to cease to be a dominant paste, it then serves the third object of providing a retarding influence, or restrainer. Also marsh-mallow, although not as swelling as the slippery elm, furnishes a slippery mucilaginous volatile paste when soaked in water. Flax-seed is another separator ingredient, on account of its fatty slippery constituents. I mention these as marked examples of the line of ingredients included in my present invention.

I do not give any formula, because my invention does not primarily depend upon any formula, inasmuch as I merely add these ingredients to the filler mass as already provided (according to my previous inventions). The amount of the slippery slimy ingredient to be added will depend largely upon the particular ingredient and also upon the particular kind of filler to which it is added, it being necessary merely to add enough to produce a workable slippery condition or slimy surface coöperating with the laying tool in accomplishing the purposes above explained while not changing the filler as a filler; i. e. it remains as a plastic, semi-solid, moldable, coherent mass when ready for use, capable of setting into a pliable or flexible, leather-adherent, non-shifting layer when laid in a shoe-bottom cavity.

Having described my invention, what I claim as new and desire to secure by Letters Patent is:

1. A shoe-bottom filler which, when in a shoe, is normally sticky, pliable, resilient and non-shifting in position, combined with means capable of rendering said filler extremely slimy and slippery while being applied to the shoe-bottom cavity.

2. A shoe-bottom filler, which, when in a shoe, is normally sticky, pliable and non-shifting in position, containing a predominant element capable of giving the filler a sleeking, slippery surface to which the laying tool cannot cling while the filler is being applied to the shoe bottom cavity, said predominant element having the further characteristic of being transitory in its sleeking, slippery influence, so as subsequently to cease to be predominant in this respect, then allowing the sticky feature of the filler to assert itself.

3. A shoe-bottom filler, which, when in a shoe, is normally sticky, pliable and non-shifting in position, containing a predominant element capable of giving the filler a sleeking, slippery surface to which the laying tool cannot cling while the filler is being applied to the shoe bottom cavity, said predominant element having the further characteristic of being transitory in its sleeking, slippery influence, and thereafter changing to a restraining and retarding influence on the rest of the filler.

4. A shoe-bottom filler, which, when in a shoe, is normally sticky, pliable and non-shifting in position, containing a predominant element capable of giving the filler a sleeking, slippery surface to which the laying tool cannot cling while the filler is being applied to the shoe bottom cavity, holding the sticky component of the filler disseminated in a finely distributed condition throughout the filler mass, and having a volatile portion which permits said element to change subsequently to a retarding influence for aiding in maintaining the remaining characteristics of the filler permanent and unchangeable.

5. A shoe-bottom filler, having a body of comminuted filler material united by a binder with a tendency to melt at low heat, combined with a relatively thick sleeking fluid sufficient in amount to give the filler mass a slimy slippery surface when being laid in the shoe-bottom cavity.

6. A shoe-bottom filler, consisting of a comminuted body material and a binder composed of a pasty component and a softening and binding component, combined with additional means for rendering the filler slimy and slippery when being laid in a shoe-bottom cavity.

7. A shoe-bottom filler, consisting of a comminuted body material and a binder composed of a pasty component and a softening and binding component, combined with volatile means temporarily dominant while the filler is being laid for rendering the filler slimy and slippery when being laid in a shoe-bottom cavity.

8. A shoe-bottom filler, consisting of a comminuted body material and a binder composed of a pasty component and a softening and binding component, combined with volatile means in predominant proportion for rendering the filler slimy and slippery when being laid in a shoe-bottom cavity and acting as a retarder for said softening component when dried and set within the mass.

9. A shoe-bottom filler, consisting of a permanently pliable, light-weight, cohesive, adhesive mass, having in its composition a vegetable extract of a jelly-like nature, sufficiently predominant to provide a sleeking slippery surface for the laying tool and coöperating with the other filler ingredients in producing a permanent pliability and stickiness.

10. A shoe-bottom filler, comprising comminuted filler material, a sticky gummy component, and including a vegetable jelly-like slimy extract in predominant quantity capable of holding the said gummy component in a finely sub-divided and disseminated condition throughout the filler mass, said filler mass being permanently pliable, adhesive, and heat-resistant under practicable conditions of temperature in use when fully set in a shoe-bottom.

11. A shoe-bottom filler, comprising a sticky gummy component, a mucilaginous firm-setting component, comminuted filler-body material, and a component uniting with the aforesaid constituents to render the filler slimy and slippery for application to the shoe-bottom cavity.

12. A shoe-bottom filler, consisting of a comminuted body material and a binder composed of a pasty component and a softening and binding component, combined with an additional slippery slimy component for maintaining the filler slippery and slimy until set in the shoe-bottom.

13. A shoe-bottom filler, consisting of a comminuted body material and a binder composed of a pasty component and a softening and binding component, combined with an additional slippery slimy soapy solution for maintaining the filler slippery and slimy until set in the shoe-bottom.

In testimony whereof, I have signed my name to this specification, in the presence of two subscribing witnesses.

ANDREW THOMA.

Witnesses:
  GEO. H. MAXWELL,
  JAMES R. HODDER.